(12) United States Patent
Czerniak et al.

(10) Patent No.: US 6,588,298 B2
(45) Date of Patent: Jul. 8, 2003

(54) ROTOR BALANCING SYSTEM FOR TURBOMACHINERY

(75) Inventors: Paul Czerniak, NPB, FL (US); Daniel G. Rubalcaba, Kennebunk, ME (US); John D. Privett, Yorktown, VA (US)

(73) Assignee: United Technologies Corporation, Hartford, CT (US)

( * ) Notice: Subject to any disclaimer, the term of this patent is extended or adjusted under 35 U.S.C. 154(b) by 28 days.

(21) Appl. No.: 09/815,742

(22) Filed: Mar. 23, 2001

(65) Prior Publication Data

US 2002/0134191 A1 Sep. 26, 2002

(51) Int. Cl.⁷ .............................................. F16F 15/22
(52) U.S. Cl. ...................................... 74/573 R; 73/470
(58) Field of Search ............................... 74/573 R, 572, 74/574; 29/894, 598; 73/470, 469

(56) References Cited

U.S. PATENT DOCUMENTS

| | | | |
|---|---|---|---|
| 4,784,012 A | * 11/1988 | Marra | 415/119 |
| 4,835,827 A | * 6/1989 | Marra | 29/407.01 |
| 4,848,182 A | * 7/1989 | Novotny | 416/144 |
| 4,926,710 A | * 5/1990 | Novotny | 29/447 |
| 5,167,167 A | 12/1992 | Tiernan, Jr. et al. | |

\* cited by examiner

*Primary Examiner*—Pam Rodriguez
(74) *Attorney, Agent, or Firm*—Bachman & LaPointe, P.C.

(57) ABSTRACT

The present invention relates to an improved rotor balancing system which allows for fine tune onsite adjustment for turbomachinery. The rotor balancing system comprises a rotor element having a row of locating slots and a device for reducing windage effects caused by the locating slots and protruding anti-rotation pins. In a preferred embodiment, the device for reducing windage effects comprises at least one balancing ring which partially or fully covers the locating slots and internal slots for engaging and disengaging that does not protrude outbound of the ring. Each balancing ring is preferably provided with two integrally formed anti-rotation members for engaging the locating slots. Each balancing ring is also preferably provided with a slot in a weighted portion of the ring for receiving a tool for positioning the balancing ring in a desired position. A method for positioning the balancing ring on a rotor element using the slot and the tool is also described herein.

5 Claims, 4 Drawing Sheets

ROTOR BALANCING SYSTEM FOR TURBOMACHINERY

BACKGROUND OF THE INVENTION

The present invention relates to a rotor balancing system for turbomachinery which safely secures balancing rings to a rotor element while reducing windage effects caused by locating slots on the rotor element and to a method for positioning a balancing ring on a rotor element.

In rotating machinery, it sometimes becomes necessary to trim the balance of one of the rotor elements after the machinery has been initially balanced for assembly and has been operating in service. Typically, the machinery must be disassembled, completely or partially, to permit rebalancing or trim balancing of the offending rotor element. With aircraft gas turbine engines, it is desirable to be able to quickly and easily trim balance a compressor rotor after an airfoil has suffered foreign object damage and the damaged blade or blades have been blended in without removal of the engine from an aircraft.

It is known in the prior art to provide a construction for trim balancing a rotating piece of machinery which construction includes an annular rotor element having an outer face and an inner circumference, locating slots around the inner circumference of the rotor element, at least one annular groove within the rotor element behind the rotor element face, balance ring means positioned in the at least one annular groove, which balance ring means is split and has a weighted mass at one end thereof, and tab means connected by pin means to the balance ring means at the weighted mass end, which pin means extends through the rotor element locating slots, and the tab means being mounted on the pin means so as to be external of the rotor element. The construction also includes a casing structure means associated with the rotor element, which casing structure means has an opening therein through which tool means may be inserted to contact the tab means and deflect the pin means inward a controlled distance to free the pin means from the locating slots and permit a circumferential relocating of the balance ring means. Such a trim balancing construction is illustrated in U.S. Pat. No. 5,167,167 to Tiernan, Jr. et al.

One of the deficiencies of the Tiernan, Jr. et al. construction is that the locating slots act similar to rotating blades, turning and heating up the air in the cavities as the rotor element rotates. As a result, heated air is injected into the flow path. The mixture of hot cavity air and cooler flow path air reduces the overall fan efficiency. Additionally, the air pumping (windage) caused by the locating slots forces more air into the flow path. The air impinges with engine core flow reducing overall engine air flow. In addition the locating pin increases windage since it protrudes outboard of the balance ring and acts as a paddle turning air. Subsequently, this adds to the reduction in engine air flow.

Another deficiency in the present design is the ability to fine tune adjust the rotor trim balance. The anti-rotation pin slop and large disk engagement slot decrease the trim balance fine tune adjustment.

SUMMARY OF THE INVENTION

Accordingly, it is an object of the present invention to provide a rotor balancing system which reduces windage effects caused by rotor element components.

It is a further object of the present invention to provide a rotor balancing system as above having at least one counterweight balancing ring which substantially eliminates air cavity pumping (windage) caused by locating slots machined into a turbomachinery rotor.

It is a further object of the present invention to provide a rotor balancing system as above which has an integral structure for securing the counterweight balancing rings to the rotor element.

It is yet another object of the present invention to provide an improved method for positioning a counterweight balancing ring on a rotor element.

The foregoing objects are achieved by the rotor balancing system and the method of the present invention.

In accordance with the present invention, a rotor balancing system for turbomachinery comprises a rotor element having a row of locating slots and means for reducing windage effects caused by the locating slots. The windage reducing means comprises at least one balancing ring secured to the rotor element which at least partially covers said locating slots to reduce windage effects.

In another aspect of the present invention, each balancing ring is provided with anti-rotation means for securing it to the rotor element. The anti-rotation means in a preferred construction comprises two integrally formed anti-rotation members for engaging two locating slots on the rotor element.

In yet another aspect of the present invention, each balancing ring is provided with a slot machined into its weighted end. When a tool is placed in the slot and pushed radially inboard, the balancing ring can have its anti-rotation members disengaged from the locating slots and can be rotated to a new position.

In still another aspect of the present invention, a method for positioning a balancing ring on a rotor element is provided. The method comprises providing a rotor element having a row of locating slots and at least one interior annular groove, inserting into the at least one interior annular groove at least one split balancing ring having a weighted end, a slot machined into the weighted end, and means for engaging the locating slots in the rotor element, and inserting the tool into the slot in the weighted end of the at least one balancing ring to disengage the at least one balancing ring from the rotor element and rotate the at least one balancing ring to a balance position.

The rotor balancing system of the present invention adds more disk engagement slots on the disk and an integral anti-rotation pin design sized closely to the disk slot. The result is more capability for fine tuning the trim balance.

Other details of the rotor balancing system and the method of the present invention, as well as other objects and advantages attendant thereto, are set forth in the following detailed description and the accompanying drawings in which like reference numerals depict like elements.

DETAILED DESCRIPTION OF THE PREFERRED EMBODIMENT(S)

Figure 1:
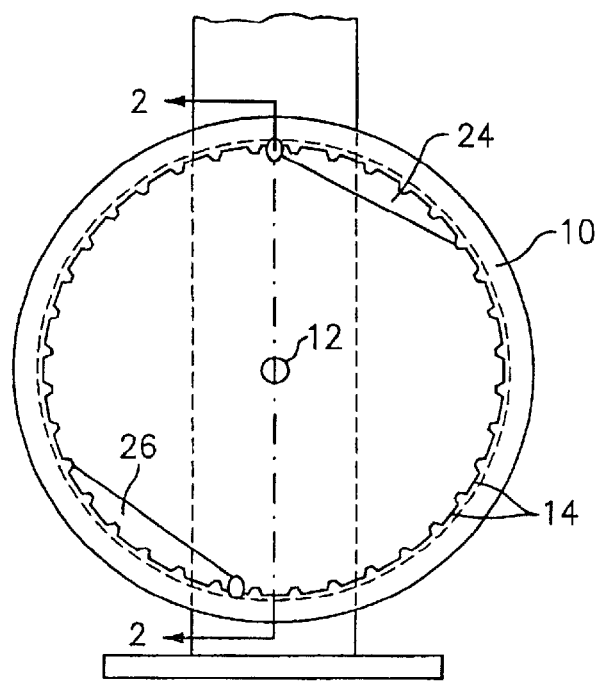
FIG. 1 is a front view of a rotor element having scalloped shaped locating slots.
Figure 2:
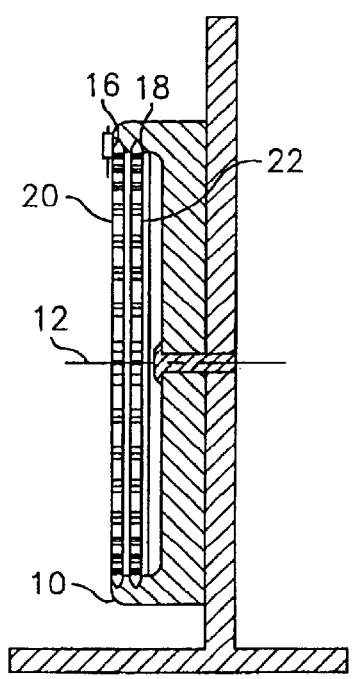
FIG. 2 is a sectional view of the rotor element of FIG. 1.
Figure 3:
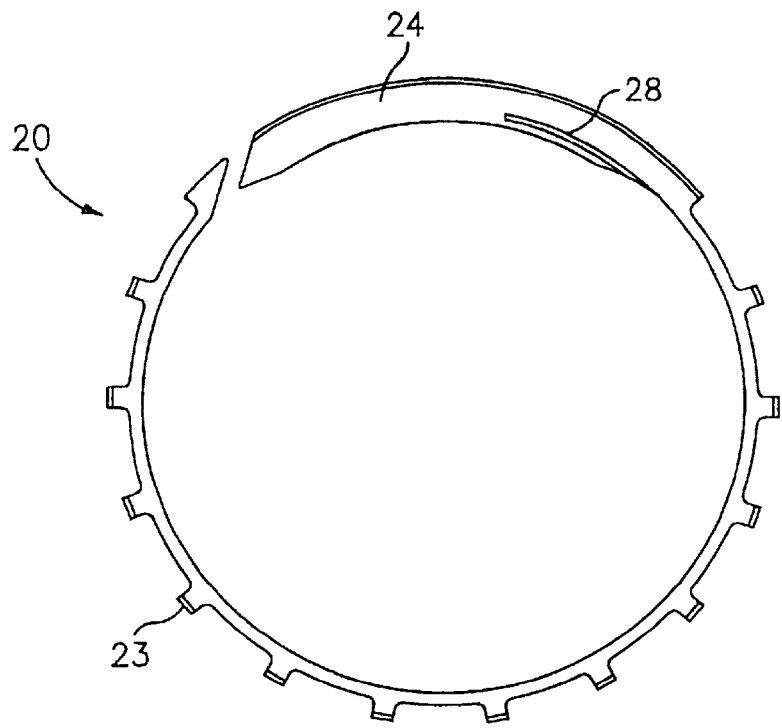
FIG. 3 is a front view of a front counterweight balancing ring to be mounted to the rotor element of FIG. 1.
Figure 4:
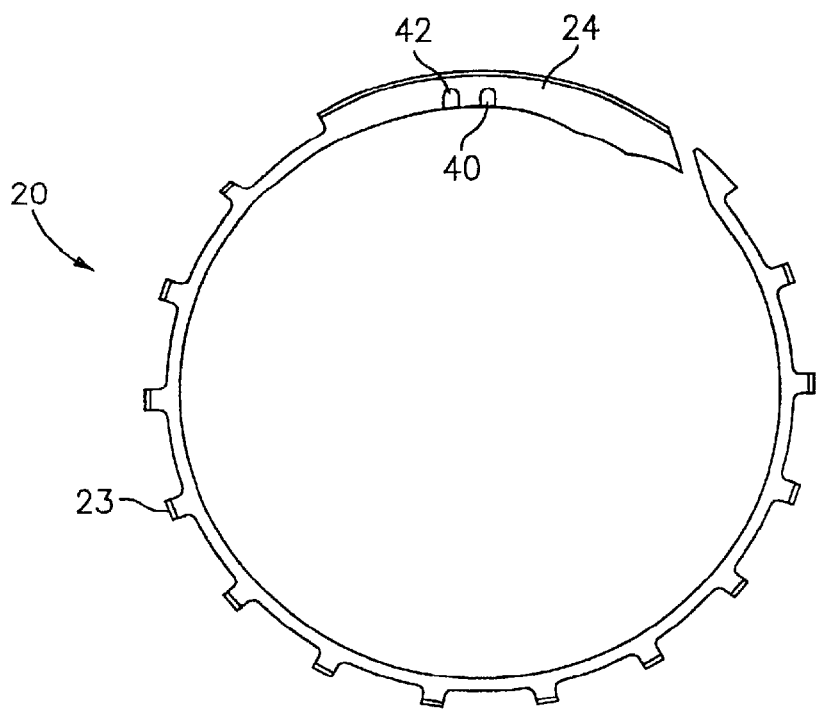
FIG. 4 is a rear view of the counterweight balancing ring of FIG. 3 showing the integrally formed means for engaging the locating slots.
Figure 5:
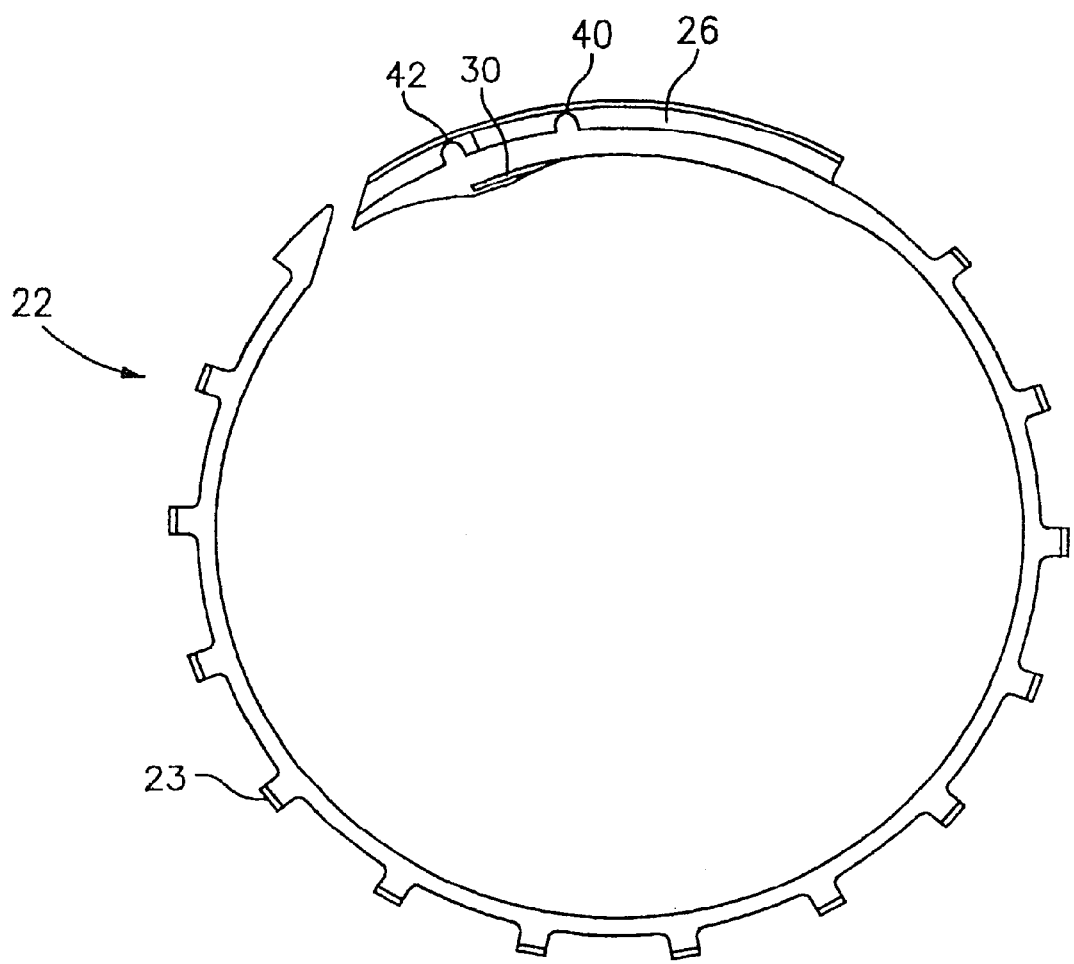
FIG. 5 is a front view of a rear counterweight balancing ring to be mounted to the rotor element of FIG. 1.
Figure 6:
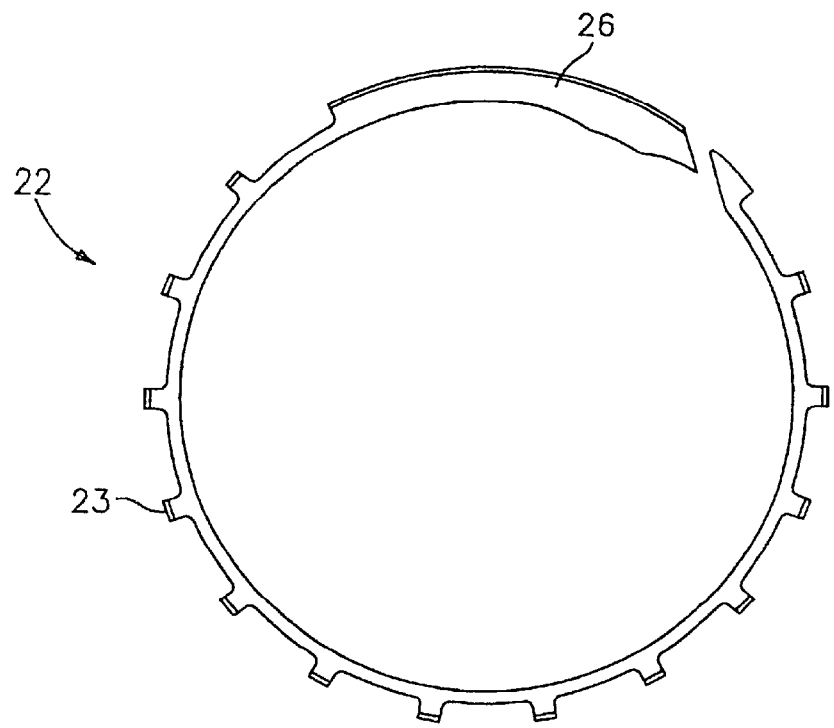
FIG. 6 is a rear view of the counterweight balancing ring of FIG. 5 showing the integrally formed means for securing the balancing ring to the rotor element.

Referring now to the drawings, FIGS. 1 and 2 illustrate an annular rotor element 10 having an axis 12 and a row of scallop shaped locating slots 14 about its inner circumference. The rotor element 10 contains two inner circumferential grooves 16 and 18. Positioned within each of the circumferential grooves is an annular counterweight balancing ring 20 and 22. Each of the counterweight balancing rings 20 and 22, as shown in FIGS. 3–6, has a split ring construction wherein a first end is spaced from a second end when said ring is in a relaxed state with the second ends of each balancing ring preferably having a weighted portion 24 and 26, respectively. Each ring 20 and 22 also has a plurality of teeth 23 for engaging the slots 14.

Figure 7:
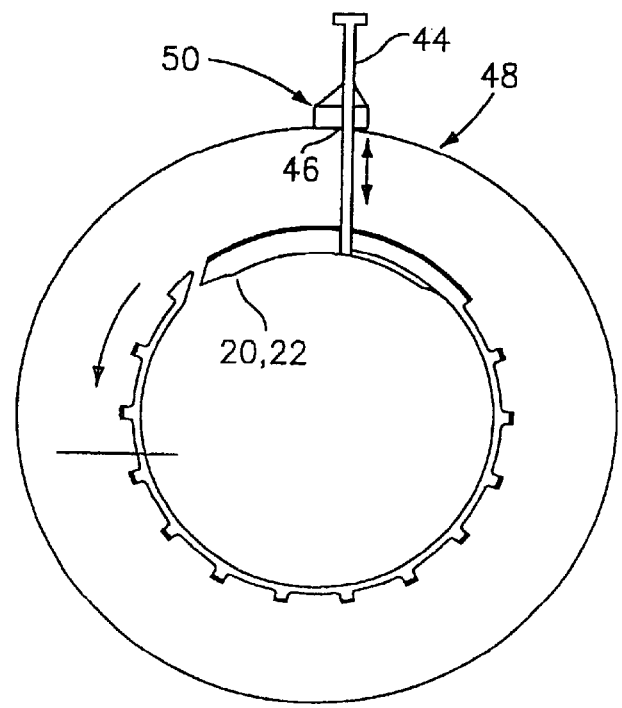
FIG. 7 illustrates a tool inserted into a slot machined in a weighted end of a counterweight balancing ring to position the balancing ring in a balance position.

Each of the counterweight balancing rings 20 and 22 is rotatable within the circumferential grooves 16 and 18 when not engaged with one or more of the locating slots 14. To facilitate its proper positioning, the balancing ring 20 has a slot 28 machined into its weighted end 24. The slot 28 may be linear or non-linear. The slot 28 is designed to receive the end of a tool 44, as shown in FIG. 7, which serves to disengage the balancing ring 20 from contact with the locating slot(s) 14. The tool 44 passes through an opening 46 in an engine casing 48 and through a bushing 50 for aligning and holding the tool 44 in place. After the tool 44 has been inserted through the opening 46, the rotor is turned counterclockwise until the tool 44 bottoms out in slot 28. After the tool 44 disengages the ring 22 from the locating slots 14, the balancing ring 20 may be rotated as desired while it is in a disengaged position by pushing the tool 44 against the end of the slot 28. To facilitate its proper positioning, the balancing ring 22 has a slot 30 machined into its weighted portion 26. The slot 30 may be linear or non-linear and is also designed to receive the end of the tool 44 for disengaging the balancing ring 22 from the locating slot(s) 14 and rotating the balancing ring 22 to a desired position.

The provision of the slots 28 and 30 is advantageous for a number of reasons. First, a slot is inherently less susceptible to failure because: (a) there is no overhanging member which can be hung up, a primary cause of failure, or be acted upon by rotating inertial forces; and (b) the method of manufacture does not require brazing, welding, small radii, or staking, the secondary cause of failure.

Once each of the balancing rings 20 and 22 has been properly positioned, the balancing rings should not rotate relative to the rotor element 10. To prevent such rotation, each of the balancing rings 20 and 22 is provided with two spaced apart anti-rotation members 40 and 42. The anti-rotation members 40 and 42 are integrally formed on the rear or inner surface of front balancing ring 20 and on the forward or inner surface of the rear balancing ring 22 and project inwardly to engage two of the locating slots 14. Each of the anti-rotation members 40 and 42 preferably is provided with large fillet radii to enhance its engagement with a locating slot 14. The engagement between the anti-rotation members 40 and 42 on each balancing ring 20 and 22 and the locating slots 14 helps prevent movement of the balancing rings 20 and 22 during use. When the balancing rings 20 and 22 are positioned on the rotor element 10, the anti-rotation members 40 and 42 on the balancing ring 20 occupy two locating slots 14 and the anti-rotation members 40 and 42 on the other balancing ring 22 occupy two different locating slots 14. When the balancing rings 20 and 22 are to be repositioned, insertion of the tool 44 into the respective slots 28 and 30 causes the anti-rotation members 40 and 42 on the balancing rings 20 and 22 to disengage from the locating slots 14 in which they are seated, thus allowing rotation of the balancing rings 20 and 22 to a new position.

While it is preferred to provide two anti-rotation members 40 and 42 on each of the balancing rings 20 and 22, the balancing rings could have more than two anti-rotation members if desired.

As previously mentioned before, the locating slots are disadvantageous in that they create aerodynamic windage. To reduce the aerodynamic windage effects, in a preferred embodiment of the present invention, each balancing ring 20 and 22 is configured or shaped to cover the scalloped shaped locating slots 14 either fully or partially. If desired, only one of the balancing rings 20 and 22, in particular the rear balancing ring, may be used to cover the locating slots 14.

In many jet engines, the rotor element has two rows of locating slots. By eliminating one of the rows, as in the present invention, windage losses are reduced and overall efficiency is improved. A 0.5% improvement in fan efficiency can be achieved merely by reducing one of the rows of locating slots. Enclosing the locating slots 14 with at least one of the balancing rings, also helps reduce windage losses and improve overall efficiency.

The new counter weight balance technology employed in the present invention reduces manufacturing costs due to the ease of machining and the reduction from two engagement rows as opposed to one row. Further, the use of integrally formed anti-rotation members to secure the balancing rings in place means that there is no possibility of loose parts, thereby improving durability. Still further, the anti-rotation members 40 and 42 provide significant structural advantages which are not possible with a pin attached to a ring.

It is apparent that there has been provided in accordance with the present invention a rotor trim balancing system which fully satisfies the objects, means, and advantages set forth hereinbefore. While the present invention has been described in the context of specific embodiments thereof, other variations, alternatives, and modifications will become apparent to those skilled in the art having read the foregoing description. Therefore, it is intended to embrace such variations, alternatives, and modifications as fall within the broad scope of the appended claims.

What is claimed is:

1. A rotor balancing system for turbomachinery comprising:

a rotor element having a row of locating slots;

means for reducing windage effects caused by said locating slots;

said windage reducing means comprising at least one balancing ring secured to said rotor element which at least partially covers said locating slots to reduce windage effects;

said at least one balancing ring having anti-rotation means for positioning said at least one balancing ring with respect to said rotor element; and said anti-rotation means comprising two integrally formed anti-rotation members on an inner surface of each said at least one balancing ring for engaging two of said slots.

2. A rotor balancing system for turbomachinery comprising:

a rotor element having a row of locating slots;

means for reducing windage effects caused by said locating slots;

said windage reducing means comprising at least two balancing rings secured to said rotor element which at least partially cover said locating slots to reduce windage effects;

each of said balancing rings having anti-rotation means for positioning said balancing rings with respect to said rotor element; and said anti-rotation means comprising two integrally formed anti-rotation members on an inner surface of each of said balancing rings and each of said anti-rotation members being positioned within a respective one of said locating slots to secure each of the balancing rings in position with respect to said rotor element.

3. A rotor balancing system for turbomachinery comprising:

a rotor element having a row of locating slots and a first annular groove;

a first balancing ring positioned within said at least one annular groove; and said first balancing ring having two integrally formed anti-rotation members on an inner surface for engaging said row of locating slots.

4. A rotor balancing system according to claim 3, further comprising:

said rotor element having a second annular groove;

a second balancing ring positioned within said second annular groove; and said second balancing ring having two integrally formed anti-rotation members on an inner surface for engaging said locating slots.

5. A rotor balancing system according to claim 3, wherein said rotor element has only a single row of locating slots.

* * * * *